(12) United States Patent
Suzuki et al.

(10) Patent No.: US 9,099,140 B2
(45) Date of Patent: Aug. 4, 2015

(54) THERMAL ENERGY ASSISTED MEDIUM

(75) Inventors: Hiroyuki Suzuki, Kanagawa (JP);
Masae Suzuki, legal representative,
Fujisawa (JP); Hiroaki Nemoto,
Kanagawa (JP); Hiroyuki Nakagawa,
Kanagawa (JP); Takayuki Ichihara,
Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 1003 days.

(21) Appl. No.: 12/630,707

(22) Filed: Dec. 3, 2009

(65) Prior Publication Data

US 2010/0165500 A1  Jul. 1, 2010

(30) Foreign Application Priority Data

Dec. 3, 2008  (JP) ................................ 2008-309053

(51) Int. Cl.
| | | |
|---|---|---|
| G11B 11/00 | (2006.01) | |
| G11B 5/667 | (2006.01) | |
| G11B 5/66 | (2006.01) | |
| G11B 5/73 | (2006.01) | |

(52) U.S. Cl.
CPC .................. G11B 5/667 (2013.01); G11B 5/66 (2013.01); G11B 5/7325 (2013.01)

(58) Field of Classification Search
None
See application file for complete search history.

(56) References Cited

U.S. PATENT DOCUMENTS

| | | | | |
|---|---|---|---|---|
| 5,370,945 A | | 12/1994 | Osato ............................. 428/635 |
| 2002/0101673 A1 | | 8/2002 | Wickramasinghe et al. ... 360/59 |
| 2004/0184176 A1 | * | 9/2004 | Shimazaki et al. ............. 360/59 |
| 2005/0146992 A1 | * | 7/2005 | Inomata et al. ............ 369/13.02 |
| 2006/0154110 A1 | | 7/2006 | Hohlfeld et al. ............... 428/823 |
| 2007/0096854 A1 | | 5/2007 | Matsumoto et al. .......... 335/208 |
| 2007/0164265 A1 | * | 7/2007 | Kajiyama .......................... 257/3 |
| 2008/0074776 A1 | * | 3/2008 | Soeya .............................. 360/59 |

(Continued)

FOREIGN PATENT DOCUMENTS

| | | | |
|---|---|---|---|
| JP | 04-143947 | 5/1992 | |
| JP | 05-020635 | 1/1993 | ............... G11B 5/31 |

(Continued)

OTHER PUBLICATIONS

Thornton, John A., "Influence of apparatus geometry and deposition conditions on the structure and topography of thick sputtered coatings" J. Vac. Sci. Technol., vol. 11, Issue 4, pp. 660-670, Jul. 1974.

(Continued)

*Primary Examiner* — Joseph Feild
*Assistant Examiner* — Henok Heyi
(74) *Attorney, Agent, or Firm* — Zilka-Kotab, PC (57) ABSTRACT

In order to provide a thermal energy assisted medium capable of improving anti-sliding reliability over long periods of time in low flying head conditions, while also maintaining a high SNR, a unique medium is proposed. A soft magnetic layer is formed on a substrate, a soft magnetic layer is formed thereon via a non-magnetic intermediate layer, and an intermediate layer, a crystal oriented control intermediate layer, an artificial lattice intermediate layer having an artificial lattice film in which a first layer comprising Co and a second layer comprising Pt and Pd are laminated repeatedly to form a recording layer, and a cap layer and an lubricating layer are formed. The concentration of Pd comprising the second layer is from about 20 atomic % to about 40 atomic %. Other mediums and systems are also described.

17 Claims, 8 Drawing Sheets

(56) References Cited

U.S. PATENT DOCUMENTS

| | | | |
|---|---|---|---|
| 2008/0225577 A1* | 9/2008 | Hosotani et al. | 365/158 |
| 2009/0135513 A1* | 5/2009 | Inomata et al. | 360/59 |
| 2010/0073804 A1* | 3/2010 | Ikeda et al. | 360/59 |
| 2010/0108496 A1* | 5/2010 | Abarra | 204/192.15 |

FOREIGN PATENT DOCUMENTS

| | | | |
|---|---|---|---|
| JP | 2005-028552 | 2/2005 | B25D 17/00 |
| JP | 2007-128573 | 5/2007 | G11B 11/105 |

OTHER PUBLICATIONS

Nemoto, Hiroaki et al., "Dependence of Co/Pd Superlattice Properties on Pd Layer Thickness" IEEE Transactions on Magnetics, vol. 39, No. 5, Sep. 2003.

Nemoto, Hiroaki et al., "Analysis of interfacial magnetic anisotropy in Co/Pt and Co/Pd multilayer films" Journal of Applied Physics 97, 10J109 (2005).

* cited by examiner

THERMAL ENERGY ASSISTED MEDIUM

RELATED APPLICATIONS

The present application claims priority to Japanese Patent Application No. 2008-309053, filed Dec. 3, 2008, which is incorporated herein by reference.

FIELD OF THE INVENTION

The present invention relates to magnetic medium for storing magnetic data, and specifically to a thermal energy assisted medium.

BACKGROUND OF THE INVENTION

According to one reference, the optimal film thicknesses of Pt and Pd at which the anisotropy magnetic field is at a maximum are about 0.2 nm and 0.6 nm, respectively, for multilayer films of Co/Pt and Co/Pd. J. Applied Physics 97, 10J109 (2005). According to another reference, as the film thickness of Pd in the multilayer film of Co/Pd becomes greater, the discharge gas pressure in forming the multilayer film and the anisotropy energy for each (Co/Pd) layer increases. IEEE Transaction on Magnetics, Vol. 39, No. 5, pp. 2714-2716, September 2003.

Japanese Patent Office (JPO) Pub. No. JP-A-5-28552 proposes a method for manufacturing a magneto optical recording medium having an artificial lattice film in which a first layer made of a metal selected from Co, Fe and Co—Fe alloy, and a second layer made of a metal selected from Pt, Pd and Pt—Pd alloy are laminated repeatedly as a recording layer.

US Pat. App. No. US2006/0154110A1 discloses a method exemplary of thermal assisted recording. US Pat. App. No. US2002/0101673A1 discloses a method for local heating of a medium, such as by using a near field heater. Also, as disclosed in JPO Pub. No. JP-A-5-20635, a magnetic head having a thin film magnetic head element is formed with a thin film resistor in which the tip of a magnetic pole is thermally expanded to project by turning on electricity to generate heat, as needed, or a thin film resistor in which the tip of the magnetic pole is thermally expanded to project by turning on electricity to generate heat when the magnetic head performs the reading/writing from/to a magnetic disk. The thin film resistor is formed inside an insulator layer of a thin film magnetic head element to have a smaller gap with the magnetic disk surface due to the projecting tip of the magnetic pole. JPO Pub. No. JP-A-2007-128573 proposes a head for a thermal assisted recording device in which the magnetic pole is disposed on top of a scatterer for generating a near field light on the bottom of a slider.

Generally, the head is loaded from an unloaded storage state away from the disk onto a rotating disk from the outer circumferential side. The head generally seeks from the inner circumference to a specific radius on the outer circumference without anchoring for a long time. If the head is kept flying in the limited specific radius continuously for a long time, a lubricating layer formed on a cap layer is depleted, causing the cap layer to easily break, and possibly leading to a device crash and failure. For example, if the head is kept flying on a medium having a radius of 32.5 nm in the limited specific radius of 21 nm at a peripheral speed of 11.88 m/s, the sliding reliability is lower only in an area near this radius of 21 nm. While the medium using the Co/Pd artificial lattice has a higher signal-to-noise-ratio (SNR) than the medium using the Co/Pt artificial lattice, it is degraded in the continuous anti-sliding reliability of measuring the reproduction output for 4096 seconds at 70° C. in which the head flying amount is set from 1.5 nm to 2 nm with the head fixed in the same radius. A thermal energy assisted medium using the artificial lattice having a high SNR that is also excellent in anti-sliding reliability has not been heretofore discovered.

Therefore, it would be beneficial in order to receive all benefits from a thermal assisted recording medium to have a medium which has an excellent continuous anti-sliding reliability during low-flying of the head, but still has a high SNR.

SUMMARY OF THE INVENTION

In one embodiment, a thermal energy assisted medium comprises an artificial lattice film, the artificial lattice film having a first layer comprising Co and a second layer comprising Pt and Pd, the concentration of Pd in the second layer being from about 20 atomic % to about 40 atomic %. The first layer and the second layer are laminated repeatedly to form a recording layer.

In another embodiment, a thermal energy assisted medium comprises an artificial lattice film, the artificial lattice film having a first layer comprising Co, and a second layer comprising Pt and Pd. The second layer comprises a lamination layer of a Pt—Pd alloy and Pt, with the concentration of Pd in the second layer being between about 20 atomic % and about 40 atomic %. Also, the first layer and the second layer are laminated repeatedly to form a recording layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a thermal energy assisted medium comprises an artificial lattice film, the artificial lattice film having a first layer comprising Co and a second layer comprising Pt and Pd, the concentration of Pd in the second layer being from about 20 atomic % (at. %) to about 40 at. %. The first layer and the second layer are laminated repeatedly to form a recording layer.

In another general embodiment, a thermal energy assisted medium comprises an artificial lattice film, the artificial lattice film having a first layer comprising Co, and a second layer comprising Pt and Pd. The second layer comprises a lamination layer of a Pt—Pd alloy and Pt, with the concentration of Pd in the second layer being between about 20 at. % and about 40 at. %. Also, the first layer and the second layer are laminated repeatedly to form a recording layer.

In order to produce a thermal energy assisted medium that can operate without the problems associated with current mediums, as described previously, an artificial lattice film in which a first layer comprising Co (preferably primarily comprising Co) and a second layer comprising Pt and Pd are laminated repeatedly to form a recording layer, according to one embodiment. The concentration of Pd in the second layer made of Pt and Pd is from about 20 at % to about 40 at. %.

According to another embodiment, a thermal energy assisted medium may have an artificial lattice film in which a first layer comprising Co (preferably primarily comprising Co) and a second layer comprising Pt and Pd are laminated repeatedly to form a recording layer. The second layer made of Pt and Pd is a lamination layer comprising alternating layers of a Pt—Pd alloy and Pt.

In any embodiment, the first layer comprised of Co may contain oxygen, boron, etc., at the same time.

According to these embodiments, a thermal energy assisted medium capable of improving the continuous antisliding reliability of a system over a long period of time in low flying head conditions while still providing a high SNR may be provided.

Several embodiments are described below with reference to the drawings.

Figure 1:
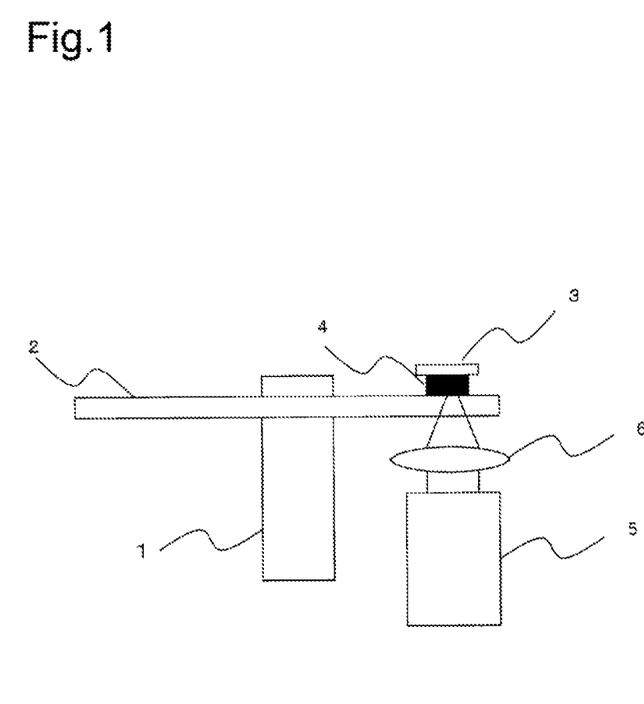
FIG. 1 is a conceptual constitutional view of the thermal energy assisted recording with back heating, according to one embodiment.

In Embodiment 1, electromagnetic conversion characteristics were evaluated by combining a thermal energy assisted medium 2 fixed to a spindle motor 1 and a head slider 4 attached via a suspension 3, as shown in FIG. 1. In recording, a laser beam having a wavelength of 660 nm emitted from a laser light source 5 disposed on the opposite side of a recording surface was converged by a lens 6 having an NA (Numerical Aperture) of 0.65 to perform the recording while heating near a write magnetic pole of a head. The diameter of a converged spot was 970 nm. The laser output was about constant at 40 mW. The head for use in this electromagnetic conversion characteristic evaluation was the head mounted on a large capacity 2.5"-type hard disk drive (HDD).

Figure 2:
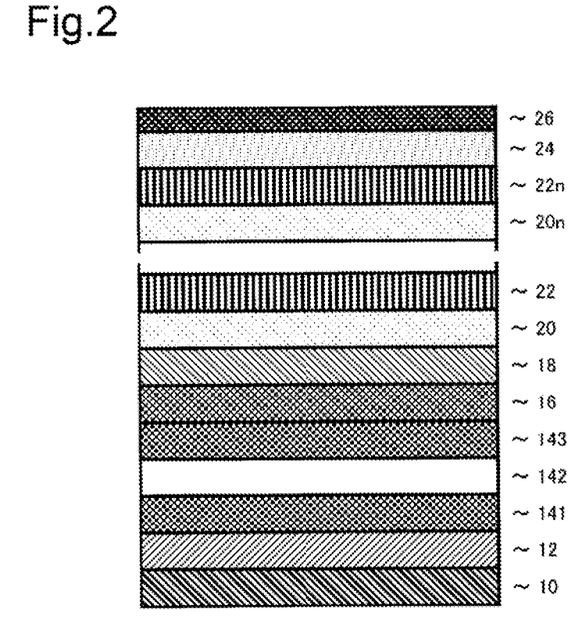
FIG. 2 is a cross-sectional view showing a thermal energy assisted medium, according to one embodiment.

FIG. 2 is a cross-sectional view showing the thermal energy assisted medium, according to Embodiment 1. This thermal energy assisted medium has an adhesive layer 12, a soft magnetic under-layer 141, a non-magnetic layer 142, a soft magnetic under-layer 143, an intermediate layer 16, a crystal oriented control intermediate layer 18, an artificial lattice intermediate layer 20, an artificial lattice magnetic layer 22, an artificial lattice intermediate layer 20n, an artificial lattice magnetic layer 22n, a cap layer 24, and an lubricating layer 26 on a rigid substrate 10.

A method for manufacturing the thermal energy assisted medium is described below, according to one embodiment. The substrate 10 was a chemically strengthened glass substrate having a thickness of 0.8 mm and an outer diameter of 65 mm. Using an inline, single wafer DC/RF magnetron sputtering apparatus, all the chambers were evacuated into vacuum of 0.2 µPa or less.

Thereafter, a carrier with the substrate 10 mounted was moved into each process chamber, whereby the following thin film formation was performed by a DC magnetron sputtering method with a discharge Ar gas pressure of 0.7 Pa, except for the artificial lattice films from the artificial lattice intermediate layer 20 and the artificial lattice magnetic layer 22 to the artificial lattice intermediate layer 20n and the artificial lattice magnetic layer 22n. Forming the thin films is not limited to only using a DC magnetron sputter, but any method known in the art may be used. To form the artificial lattice layers 20 to 22, a DC magnetron sputtering method with a rotational cathode mechanism was employed and the discharge Ar gas pressure was 2 Pa. A DC pulse sputtering method or an RF magnetron sputtering method may be also used in forming the thin film containing oxide, along with any other method known in the art.

Table 1 lists the discharge gas pressure, sputtering method, target composition and representative film thickness in forming the thermal energy assisted medium having the layer composition as shown in FIG. 2.

TABLE 1

| Symbol | Element | Pressure | Sputtering method | Target | Film thickness |
|---|---|---|---|---|---|
| 10 | Substrate | 2.0 µPa Evacuation | — | — | (0.8 mm) |
| 12 | Adhesive layer | 0.7 Pa—Ar | DC Magnetron | 50 at. % Al—50 at. % Ti | 5 nm |
| 141 | Soft magnetic under-layer | 0.7 Pa—Ar | DC Magnetron | 51 at. % Fe—34 at. % Co—10 at. % Ta—5 at. % Zr | 20 nm |
| 142 | Non-magnetic layer | 0.7 Pa—Ar | DC Magnetron | 99.9 wt. % Ru | 0.7 nm |
| 143 | Soft magnetic under-layer | 0.7 Pa—Ar | DC Magnetron | 51 at. % Fe—34 at. % Co—10 at. % Ta—5 at. % Zr | 20 nm |
| 16 | Paramagnetic intermediate layer | 0.7 Pa—Ar | DC Magnetron | Ni—5 at. % Cr—8 at. % W | 5 nm |
| 18 | Crystal oriented control intermediate layer | 0.7 Pa—Ar | DC Magnetron | 99.9 wt. % Ru | 5 nm |

TABLE 1-continued

| Symbol | Element | Pressure | Sputtering method | Target | Film thickness |
|---|---|---|---|---|---|
| 20 | Artificial lattice magnetic layer | 2.0 Pa—Ar | Rotation cathode | (80-60) at. % Pt—(20-40) at. % Pd | 0.4 nm |
| 22 | Artificial lattice magnetic layer | 2.0 Pa—Ar | Rotation cathode | 99.9 wt. % Co | 0.4 nm |
| 20n | Artificial lattice intermediate layer | 2.0 Pa—Ar | Rotation cathode | (80-60) at. % Pt—(20-40) at. % Pd | 0.4 nm |
| 22n | Artificial lattice magnetic layer | 2.0 Pa—Ar | Rotation cathode | 99.9 wt. % Co | 0.4 nm |
| 24 | Cap layer | 0.7 Pa—Ar | DC Magnetron | 99.9 wt. % C | 2.5 nm |

In this embodiment, the glass substrate 10, made of boron-silicate glass or alumino silicate glass with the substrate surface chemically strengthened, was cleaned and dried. In the situation where the head formed with a waveguide for heating is used will be described in Embodiment 4. The substrate with the surface polished after plating Ni—P on the aluminum alloy substrate, or the rigid substrate made of Si or Ti alloy may be employed, instead of the chemically strengthened glass substrate. Of course, any other suitable substrate may be used as would be known to one of skill in the art. The outer diameter of the substrate is not limited to 65 mm, but may be selected from 48 mm, 84 mm, etc. The thickness of the substrate can be selected in a range where the rigidity is not compromised, and for this embodiment, it was selected to be 0.635 mm. The adhesive layer 12 was formed as a 50 at. % Al/50 at. % Ti alloy film having a thickness of 5 nm.

The soft magnetic layer 141 was formed as the alloy film of 51 at. % Fe/34 at. % Co/10 at. % Ta/5 at. % Zr, having a thickness of 20 nm. The non-magnetic layer 142 was formed as an Ru film having a thickness of 0.7 nm, and then, the soft magnetic under-layer 143 was formed as the alloy film of 51 at. % Fe/34 at. % Co/10 at. % Ta/5 at. % Zr, having a thickness of 20 nm. The compositions of the soft magnetic layers 141 and 143 are not limited to the above compositions, and any suitable compositions may be used as known to those of skill in the art. When the concentration of additional elements of Ta and Zr were 20 at. % in total, the writing characteristic was improved, as long as each of the soft magnetic under-layers 141 and 143 were made thicker than 20 nm. The alloy of 51 at. % Fe/34 at. % Co/10 at. % Ta/5 at. % Zr may be replaced by any suitable material, such as the alloy of 48 at. % Fe/37 at. % Co/10 at. % Ta/5 at. %. Zr, for example, while the concentration of additional elements of Ta and Zr is fixed at 15 at. %. From the measurement results of a reflection curve by X-ray diffraction, it has been determined that the Fe—Co—Ta—Zr alloy film is microcrystal or amorphous.

The non-magnetic layer 142 may be primarily comprised of Ru or an alloy of Ru, such as Ru-50 at. % Fe, Ru-40 at. % Cr, Ru-30 at. % Co, etc., but is not so limited. The film thickness may be selected to be in a range where the soft magnetic layers 141 and 143 are antiferromagnetically coupled. Further, if the remanant magnetizations of the soft magnetic layers 141 and 143 are made equal and antiparallel, using this antiferromagnetic coupling, the regeneration noise can be decreased. After forming the soft magnetic under-layer 143, the paramagnetic intermediate layer 16 made of Ni—Cr—W alloy was formed.

Further, after forming the crystal oriented control intermediate layer 18, which primarily comprises Ru, but is not so limited, the artificial lattice intermediate layer 20 made of a Pt—Pd alloy and the artificial lattice magnetic layer 22 primarily comprising Co (but not so limited) were alternately formed, totaling 20 layers of each material (40 total layers). Of course, more or less layers may be formed, such as at least 5 of each of the layers, such as 6 layers of each, 12 layers of each, 24 layers of each, 50 layers of each, etc.; less than 30 layers of each; etc. Thus, 20 layers is just an example of a total amount, according to one embodiment. This multilayer in which multiple layers of each type are formed alternately is called a recording layer. The number of lamination layers for the artificial lattice is not limited to 20 of each. It may be changed to obtain a desired output. The artificial lattice magnetic layer 22 primarily comprising Co (but not so limited) was formed by DC magnetron sputtering the Co target having a purity of 99.9 wt % dissolved in vacuum. Thereafter, the cap layer 24 primarily comprising carbon (but not so limited) and the lubricating layer 26 comprising a perfluoropolyether were formed. Any suitable material may be used for the lubricating layer 26 as would be known to one of skill in the art.

Figure 3:
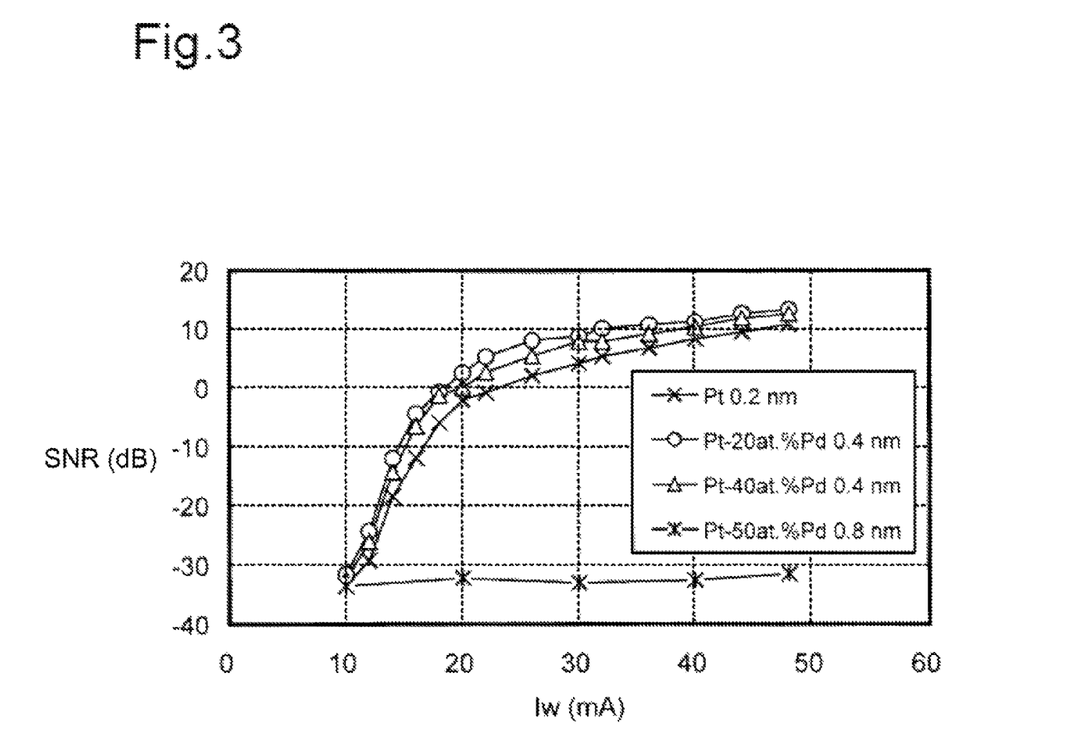
FIG. 3 is a view showing the relationship between SNR and write current lw.

The following four kinds of materials were compared for the artificial lattice intermediate layer 20. That is, four embodiments of materials used as the artificial lattice intermediate layer 20, (1) a Pt-20 at. % Pd alloy layer was formed in a thickness of 0.4 nm, (2) a Pt-40 at. % Pd alloy layer was formed in a thickness of 0.4 nm, (3) a Pt-50 at. % Pd alloy layer was formed in a thickness of 0.8 nm, and (4) a Pt layer instead of a Pt—Pd alloy layer was formed in a thickness of 0.2 nm. FIG. 3 shows the measurement results of the relationship between SNR and write current lw at 16.5 kfc/mm (kiloflux change per millimeter) in each embodiment where the number of laminations is 20.

From FIG. 3, it can be seen that the SNR was improved if the write current lw was increased, except for the (3) embodiment where the Pt-50 at. % Pd alloy layer was formed in a thickness of 0.8 nm. In this case, it is assumed that the signal could not be written without regard to the write current lw, and the SNR was not improved, because the signal was written by heating the medium beyond the Curie temperature Tc. In the (1) and (2) embodiments, where the Pt—Pd alloy layer was formed in a thickness of 0.4 nm, the SNR was improved without regard to the write current lw, more so than in the (4) embodiment, where the Pt layer was formed in a thickness of 0.2 nm. This is because the thickness was increased to 0.4 nm by adding Pd to Pt so that the Curie temperature Tc was lower and the writing was facilitated.

Figure 4:
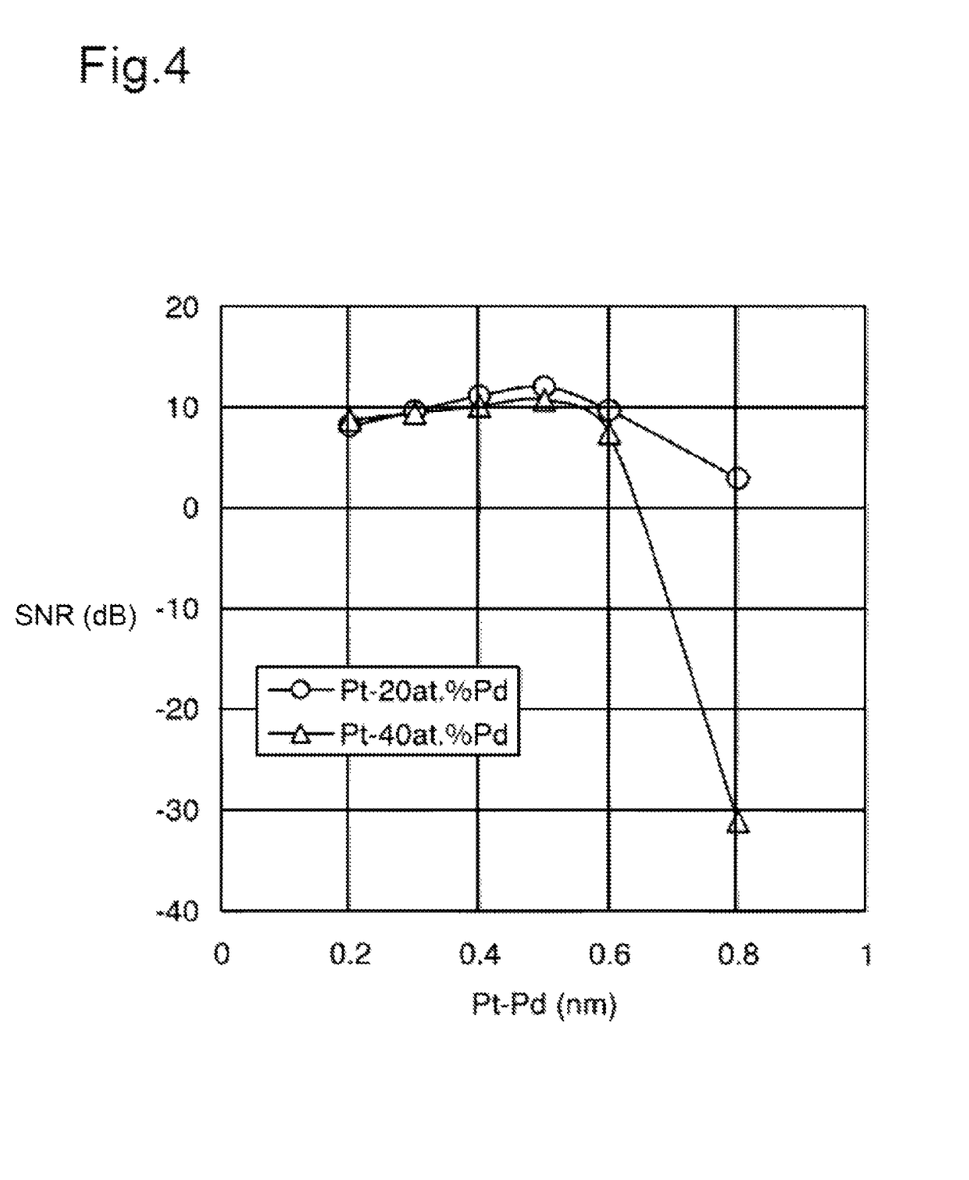
FIG. 4 is a view showing the relationship between SNR and the film thickness of a Pt-40 at. % Pd alloy film.

The thin film was formed by sputtering under the conditions as listed in Table 1, with the thickness of the artificial lattice magnetic layers 22, 22n fixed, except that the thickness of the Pt-40 at. % Pd alloy layers 20, 20n were changed to 0.2 nm, 0.3 nm, 0.5 nm, 0.6 nm and 0.8 nm. Thereafter, the lubricating layer 26 made of perfluoropolyether was formed. FIG. 4 shows the measurement results of the relationship between SNR and write current lw at 16.5 kfc/mm with the write current lw fixed at 40 mA for these thermal energy assisted media in which the number of laminations is 20 for each.

From FIG. 4, as the thickness of the Pt—Pd alloy layers 20, 20n was increased from 0.2 nm, the SNR was increased to reach the maximal value at 0.5 nm. Further, if the thickness of the Pt—Pd alloy layers 20, 20n was increased up to 0.6 nm, the SNR started to decrease. If the thickness of the Pt—Pd alloy layers 20, 20n was 0.8 nm, the SNR was lower. This decrease in the SNR was also observed when the thickness of the Pt-50 at. % Pd alloy layer was formed in 0.8 μm in (3) as shown in FIG. 3.

Figure 5:
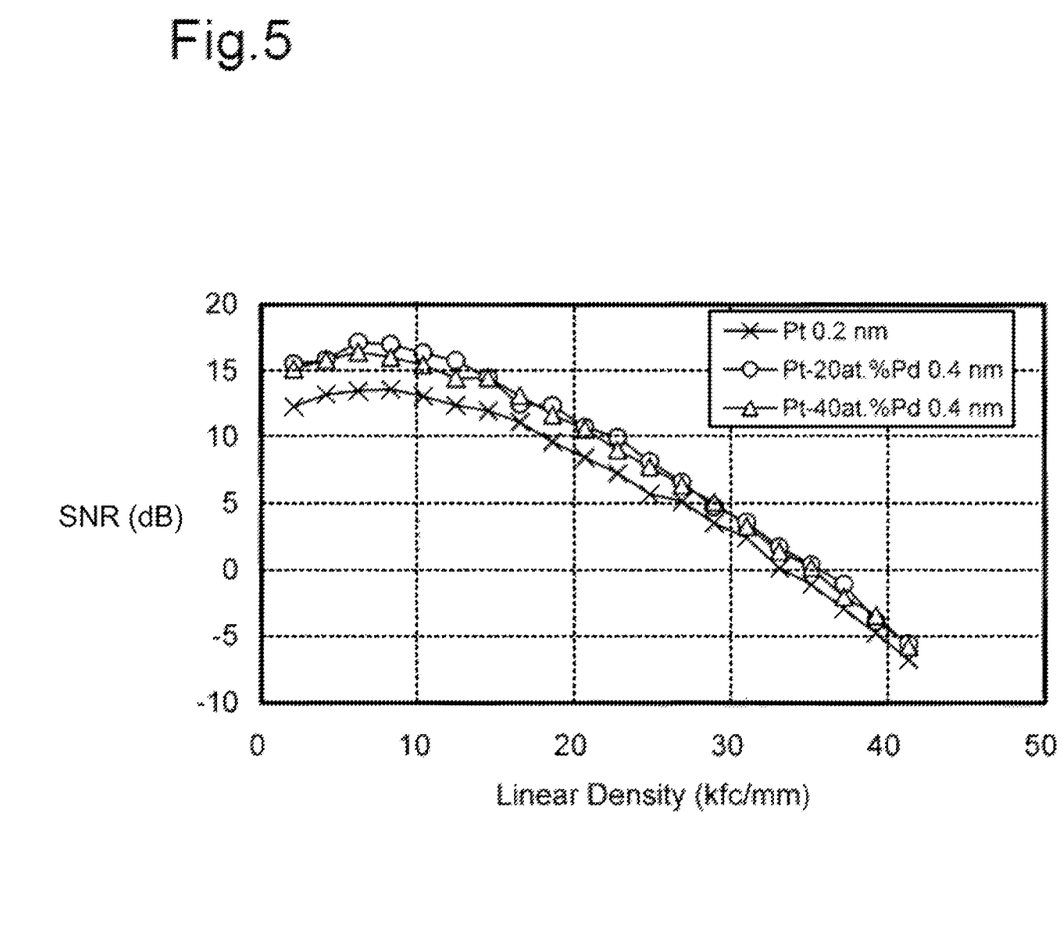
FIG. 5 is a view showing the relationship between SNR and linear recording density.

FIG. 5 shows the results of evaluating the linear recording density dependency of the SNR, with the write current lw fixed at 40 mA, for the magnetic recording media of (1), (2) and (4) that were selected based on these results.

The SNR measured at the write current lw=40 mA was even more exceptional in the range where the recording density (kilo flux change) per mm was from 2.1 kfc/mm to 41.3 kfc/mm in the cases where (1) the Pt-20 at. % Pd alloy layer was firmed in thickness of 0.4 nm and (2) the Pt-40 at. % Pd alloy layer was formed in thickness of 0.4 nm, than in the case where (4) the Pt layer was formed in thickness of 0.2 nm (comparative example), as shown in FIG. 5.

Also, $N_{had}$ (sum of noise of head, amplifier and disk) measured at lw=40 mA was lower in the range where the recording density (flux change) per mm was from 2.1 kfc/mm to 41.3 kfc/mm in the cases where (1) the Pt-20 at. % Pd alloy layer was formed in thickness of 0.4 nm and (2) the Pt-40 at. % Pd alloy layer was formed in thickness of 0.4 nm, than in the case where (4) the Pt layer was formed in thickness of 0.2 nm (comparative example), whereby it was clear that the $N_{had}$ was increased as the linear recording density was greater in the cases (1) and (2).

A continuous sliding test for 4096 seconds was conducted for these thermal energy assisted media in an environment of 70° C., where the flying height of the head from the medium surface was 2 nm, and the skew angle was 0° for the same track having a radius of 21 mm. In any medium of (1), (2) and (4), an output decrease measured before and after the continuous sliding test was within 2% without crash after the passage of 4096 seconds. A stable reproduction output was obtained without problem with the sliding reliability.

According to Embodiment 2, a thermal energy assisted medium of the organization as listed in Table 2 was produced by forming a crystal oriented control intermediate layer 19 between the crystal oriented control intermediate layer 18 and the artificial lattice intermediate layer 20 as used in Embodiment 1 and forming the Co-8 at. % B-4 mol. % $Co_3O_4$ alloy in a thickness of 0.4 nm, instead of the artificial lattice magnetic layer 22 formed by sputtering the target made of Co as the main component. If the thin film is formed at a higher Ar pressure by sputtering, the mobility of atoms in depositing the thin film is lower, so that the continuity of the thin film is decreased and isolation occurs. This phenomenon is known as a self shadowing effect. By forming the spatially separated intermediate layer 19 using the same material after performing the highly crystalline, continuous intermediate layer 18, it is possible to form a intermediate layer that is relatively more discontinuous and isolated in the film in-plane direction and has a more excellent crystal orientation than the intermediate layer 18.

TABLE 2

| Symbol | Element | Pressure | Sputtering method | Target | Film thickness |
|---|---|---|---|---|---|
| 10 | Substrate | 2.0 μPa Evacuation | — | — | (0.8 mm) |
| 12 | Adhesive layer | 0.7 Pa—Ar | DC Magnetron | 50 at % Al—50 at. % Ti | 5 nm |
| 141 | Soft magnetic underlayer | 0.7 Pa—Ar | DC Magnetron | 51 at. % Fe—34 at. % Co—10 at. % Ta—5 at. % Zr | 20 nm |
| 142 | Non-magnetic layer | 0.7 Pa—Ar | DC Magnetron | 99.9 wt. % Ru | 0.7 nm |
| 143 | Soft magnetic underlayer | 0.7 Pa—Ar | DC Magnetron | 51 at. % Fe—34 at. % Co—10 at. % Ta—5 at. % Zr | 20 nm |
| 16 | Paramagnetic intermediate layer | 0.7 Pa—Ar | DC Magnetron | Ni—5 at. % Cr—8 at. % W | 5 nm |
| 18 | Crystal oriented control intermediate layer | 0.7 Pa—Ar | DC Magnetron | 99.9 wt. % Ru | 4 nm |
| 19 | Crystal oriented control intermediate layer 2 | 2.0 Pa—Ar | DC Magnetron | 99.9 wt. % Ru | 4 nm |
| 20 | Artificial lattice intermediate layer | 2.0 Pa—Ar | Rotation cathode | (80-60) at. % Pt—(20-40) at. % Pd | 0.4 nm |
| 22 | Artificial lattice magnetic layer | 2.0 Pa—Ar | Rotation cathode | Co—8 at. % B—4 mol. % $Co_3O_4$ | 0.4 nm |
| 20n | Artificial lattice intermediate layer | 2.0 Pa—Ar | Rotation cathode | (80-60) at. % Pt—(20-40) at. % Pd | 0.4 nm |
| 22n | Artificial lattice magnetic layer | 2.0 Pa—Ar | Rotation cathode | Co—8 at. % B—4 mol. % $Co_3O_4$ | 0.4 nm |
| 24 | Cap layer | 0.7 Pa—Ar | DC Magnetron | 99.9 wt. % C | 2.5 nm |

The SNR was evaluated with a flying distance of the head of 1.5 nm. A laser output used for heating during the writing was fixed at 40 mW. As a result, the SNR measured at the write current lw=40 mA was better by 0.6 dB to 1.1 dB in the range where the flux change per mm was from 2.1 kfc/mm to 41.3 kfc/mm in the cases where (1) the Pt-20 at. % Pd alloy layer was formed in a thickness of 0.4 nm and (2) the Pt-40 at. % Pd alloy layer was formed in a thickness of 0.4 nm, than in the case where (4) the Pt layer was formed in a thickness of 0.2 nm for the artificial lattice intermediate layers 20, 20n (comparative example).

The thermal energy assisted medium was formed by sputtering under the conditions as listed in Table 2, with the thickness of the artificial lattice magnetic layers 22, 22n fixed, except that the thickness of the Pt-40 at. % Pd alloy layers 20, 20n was changed to 0.2 nm, 0.3 nm, 0.5 nm, 0.6 nm and 0.8 nm. Thereafter, the lubricating layer 26 made of perfluoropolyether was formed. For these thermal energy assisted media in which the number of laminations was 20 of each, the SNR at 16.5 kfc/mm was measured in which the write current lw was fixed at 40 mA, and the head flying height from the medium surface was 1.5 nm.

If the thickness of the Pt-40 at. % Pd alloy layers 20, 20n was larger than 0.2 nm, the SNR was increased, and when the thickness of the Pt-40 at. % Pd alloy layers 20, 20n was 0.4 nm, the SNR reached the maximal value 13.4 dB. When the thickness of the Pt-40 at. % Pd alloy layers 20, 20n was 0.6 nm, the SNR was decreased to 11.8 dB. When the thickness of the Pt-40 at. % Pd alloy layers 20, 20n was 0.8 nm, the SNR was significantly decreased.

A sliding test for 4096 seconds was conducted for these magnetic recording media in an environment of 70° C., where the flying height of the head was set to 1.5 nm, and the skew angle was 0° for the same track having a radius of 21 mm. In the case of the Pt-40 at. % Pd alloy layer and the Pt-20 at. % Pd alloy layer, for any medium in which the thickness of the artificial lattice layers 20, 20n was from 0.2 nm to 0.6 nm, a stable reproduction output by flying was obtained without crash or failure after the passage of 4096 seconds, whereby there was no problem with the continuous sliding reliability. On the other hand, when the thickness of the Pt-40 at. % Pd alloy layers 20, 20n was 0.8 nm, the head crashed without awaiting the passage of 4096 seconds.

From the above results, it is clear that the first layer primarily comprising Co which is formed by DC magnetron sputtering the Co target having a purity of 99.9 wt % dissolved in vacuum in Embodiment 1, but may contain oxygen and boron at the same time as described in Embodiment 2.

Figure 6:
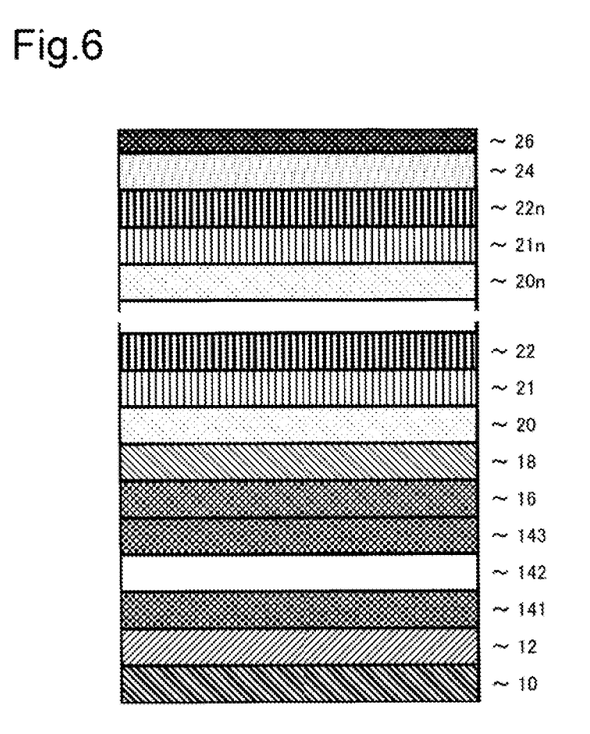
FIG. 6 is a cross-sectional view showing a thermal energy assisted medium, according to one embodiment.

In Embodiment 3, instead of alternately forming the artificial lattice intermediate layer 20 made of a Pt—Pd alloy and the artificial lattice magnetic layer 22 primarily comprising Co (but not so limited), 20 layers of each, as in Embodiment 1, the artificial lattice intermediate layer 20 made of a Pt—Pd alloy in a thickness from 0.2 to 0.4 nm, the artificial lattice intermediate layer 21 made of Pt in thickness from 0 to 0.2 nm, and the artificial lattice magnetic layer 22 primarily comprising Co (but not so limited) were alternately formed, 20 layers of each, as shown in FIG. 6. This multilayer in which 20 layers of each are alternately formed is called a recording layer. As the artificial lattice magnetic layer 22 primarily comprising Co (but not so limited), the alloy of Co/6 at. % B/5 mol. % CoO was formed in a thickness of 0.4 nm. The thermal energy assisted medium was formed in the same way as in Embodiment 1, except for that, whereby the SNR was evaluated at lw=40 mA. A laser output used for heating during the writing was fixed at 40 mW. As a result, if the Pt-20 at. % Pd alloy or Pt-40 at. % Pd alloy was selected for the artificial lattice intermediate layer 20 as listed in Table 3, the SNR was better by 1.0 to 1.7 dB in combination with Pt of the artificial lattice intermediate layer 21 than the medium 3-0 in the comparative example.

A continuous sliding test for 4096 seconds was conducted for these thermal energy assisted media of Examples 3-1 to 3-8 in an environment of 70° C., where the flying height of the head from the medium surface was set to 1.5 nm, and the skew angle was 0° for the same track having a radius of 21 mm. In any medium, a stable reproduction output by flying was obtained without crash after the passage of 4096 seconds, whereby there was seen no crash due to the continuous sliding.

TABLE 3

| | Artificial lattice intermediate layer 20 | Artificial lattice intermediate layer 21 | SNR (dB) |
|---|---|---|---|
| Comparative example 3-0 | Pt—20 at. % Pd (0 nm) | Pt (0.2 nm) | 11.5 |
| Example 3-1 | Pt—20 at. % Pd (0.2 nm) | Pt (0.2 nm) | 12.7 |
| Example 3-2 | Pt—20 at. % Pd (0.3 nm) | Pt (0.2 nm) | 13.0 |
| Example 3-3 | Pt—20 at. % Pd (0.4 nm) | Pt (0.1 nm) | 12.8 |
| Example 3-4 | Pt—20 at. % Pd (0.4 nm) | Pt (0 nm) | 12.5 |
| Example 3-5 | Pt—40 at. % Pd (0.2 nm) | Pt (0.2 nm) | 12.8 |
| Example 3-6 | Pt—40 at. % Pd (0.3 nm) | Pt (0.2 nm) | 13.2 |
| Example 3-7 | Pt—40 at. % Pd (0.4 nm) | Pt (0.1 nm) | 13.1 |
| Example 3-8 | Pt—40 at. % Pd (0.4 nm) | Pt (0 nm) | 12.9 |

From the above results, it is clear that the first layer primarily comprising Co (hut not so limited) that is formed by DC magnetron sputtering the Co target having a purity of 99.9 wt % dissolved in vacuum as in Embodiment 1, but may be made of the alloy of Co/8 at. % B/4 mol. % $Co_3O_4$ containing oxygen and boron at the same time as described in Embodiment 2, or the alloy of Co/6 at. % B/5 mol. % CoO as the artificial lattice magnetic layer 22 primarily comprising Co in a different composition from Embodiment 2.

Figure 7:
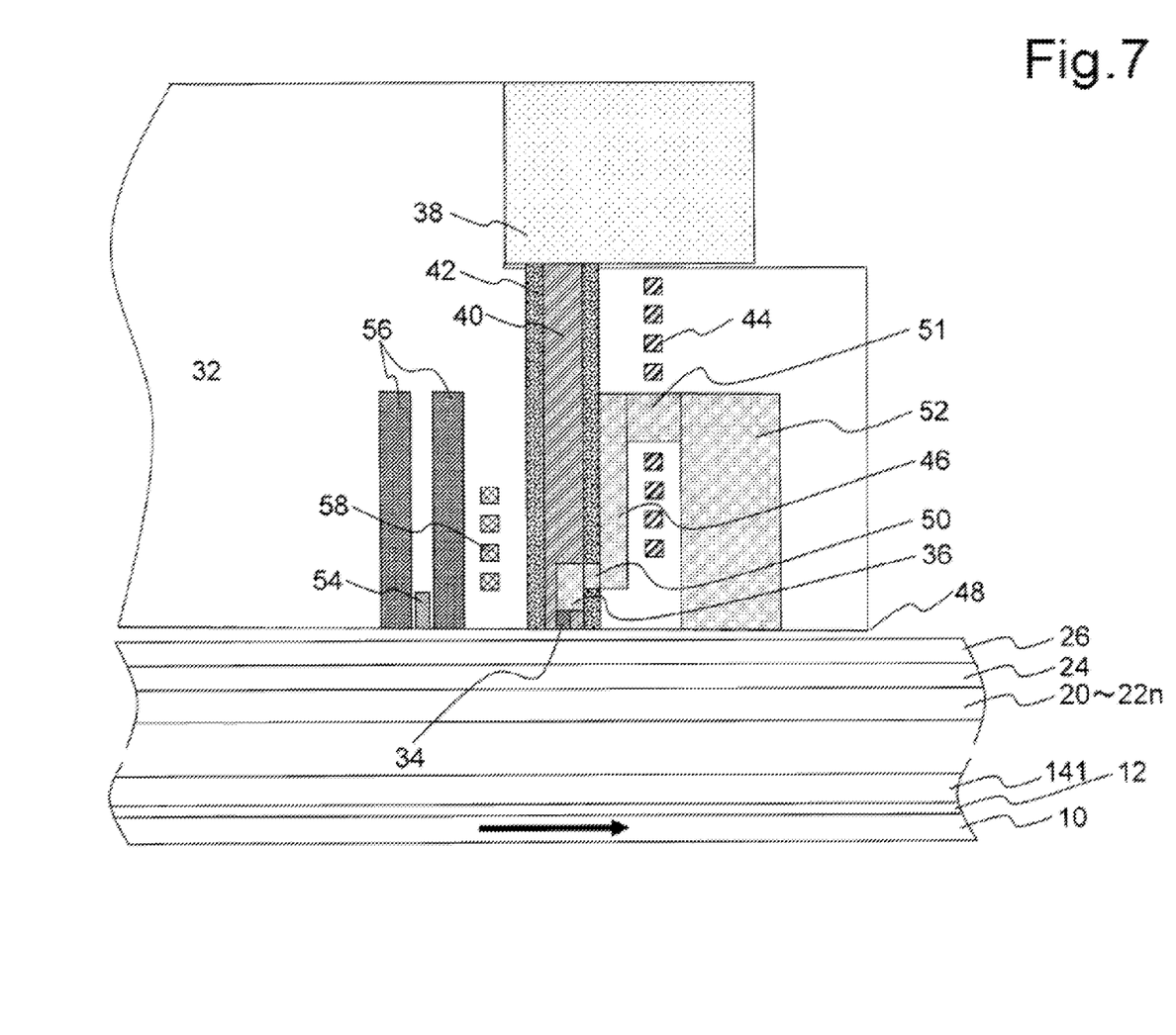
FIG. 7 is a cross-sectional view of the thermal energy assisted recording head, according to one embodiment.

In Embodiment 4, after confirming the mechanical flying characteristic, the recording was performed by a write magnetic pole with a geometrical track width PW of 105 nm, and the electromagnetic conversion characteristic of the thermal energy assisted medium was measured using a TMR (Tunneling Magneto Resistive) head having a shield gap length of 35 nm. FIG. 7 is a cross-sectional view around a recording head that combines a magnetic monopole head and a scatterer for generating the near field light, according to one embodiment.

The scatterer 34 for generating the near field light was formed on the surface of a slider 32, and a magnetic pole 36 was formed thereon. The light was generated using a semiconductor laser 38 having a wavelength of 785 nm, and the light emitted from the semiconductor laser 38 was led to the scatterer 34, using a waveguide comprising a core portion 40 and a clad portion 42. The core portion 40 of the waveguide is surrounded by the clad portion 42. A magnetic field generated using a thin film coil 44 was led near the scatterer 34 by a main magnetic pole 46. The main magnetic pole 46 and the thin film coil 44 were disposed on the side of a flow-out end 48 in the waveguide. The magnetic pole 36 and the main magnetic pole 46 on the top of the scatterer 34 were connected using a magnetic pole 50. On the opposite side of the thin film coil 44, an auxiliary magnetic pole 52 for forming a closed magnetic circuit was formed via a magnetic pole 51. A coil 44 is linked to a magnetic circuit formed by the magnetic poles 36 and 50 on the scatterer 34, the main magnetic pole 46, the magnetic pole 51, and the auxiliary magnetic pile 52. A magnetic reproducing element 54 for reproducing a recording signal was formed beside the waveguide. A shield 56 for shielding a magnetic field from the surroundings was formed around the magnetic reproducing element 54. This reproducing element may be placed beside the auxiliary magnetic pole 52 (on the side of the flow-out end 48), but in this embodiment the reproducing element is disposed as shown in FIG. 7, in which a TMR element was employed as the magnetic reproducing element 54. A thin film resistor 58 was formed in which the reproducing element 54 was thermally expanded and protruded by turning on electricity to generate heat, as needed. Of course, other arrangements are possible, and this is just one embodiment, and not meant to be limiting in any way.

In recording, light was emitted using the semiconductor laser 38 having a wavelength of 785 nm with 100 mW, and the heating was made for recording. In reproducing, the electromagnetic conversion characteristic for the magnetic recording media as prepared in Embodiment 3 was evaluated with a radius of 21 mm and at a skew angle of 0° under the condition of turning on electricity of 60 mW to the thin film resistor 58 without using the semiconductor laser 38 having the wavelength of 785 nm.

As a result, the value of SNR from 12.2 to 13.7 dB was obtained for any medium of Examples 3-1 to 3-8 as listed in Table 3. A sliding test for 4096 seconds was conducted in an environment of 70° C. where the flying height from the medium surface of the head was 2 nm. In any medium, a stable reproduction output by flying was obtained without crash after the passage of 4096 seconds, whereby there was no crash due to the continuous sliding.

Figure 8:
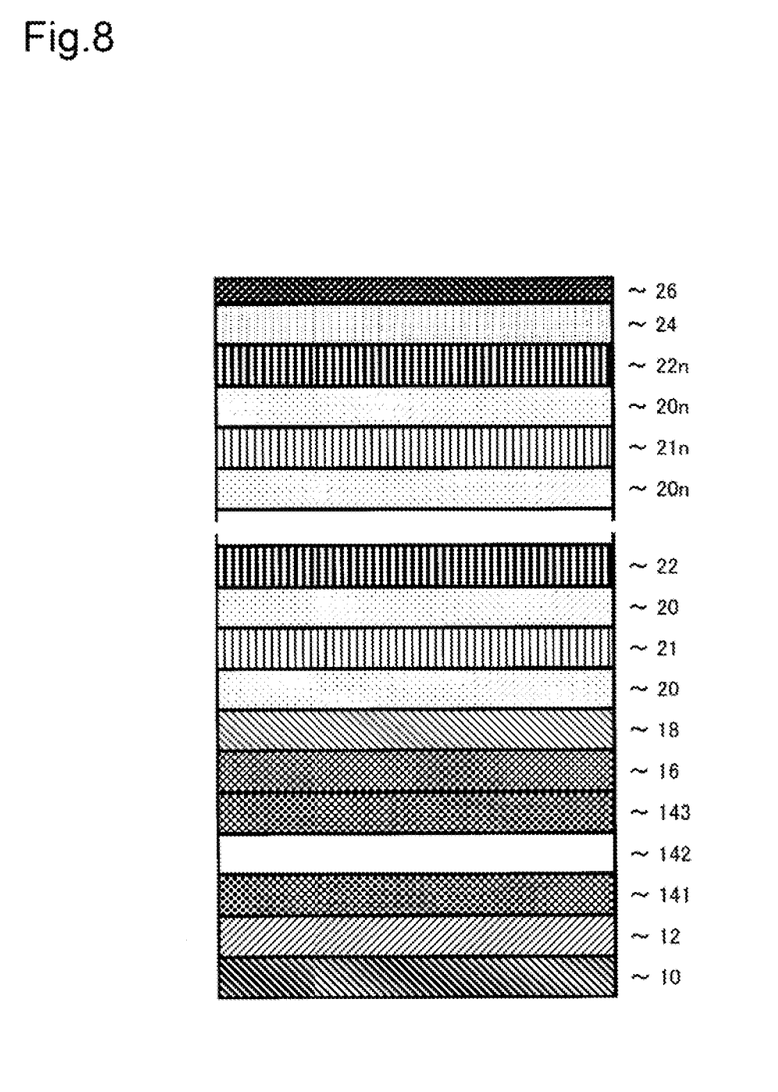
FIG. 8 is a cross-sectional view of a magnetic recording medium, according to one embodiment.

In Embodiment 5, instead of alternately forming the artificial lattice intermediate layer 20 made of Pt—Pd alloy and the artificial lattice magnetic layer 22 primarily comprising Co, 20 layers of each, as in Embodiment 1, the artificial lattice intermediate layer 20 made of Pt in a thickness of 0.2 nm, the artificial lattice intermediate later 21 made of Pd in a thickness of 0.2 nm, the artificial lattice intermediate layer 20 made of Pt in a thickness of 0.2 nm, and the artificial lattice magnetic layer 22 made of Co as a primary component were alternately formed in this order, 20 layers of each, as shown in FIG. 8. This multilayer in which 20 layers of each are alternately formed is a recording layer. A magnetic recording medium was formed in the same way as in Embodiment 1, except that the Co-8 at. % 13-4 mol. % CoO alloy was formed in a thickness of 0.4 nm, instead of the artificial lattice magnetic layer 22 made of Co as a primary component, whereby the SNR was evaluated. When a laser output was set to 32 mW using a head mounted on a large capacity 2.5"-type hard disk drive in the arrangement of FIG. 1, the SNR of about 13.5 dB was obtained.

A continuous sliding test for 4096 seconds was conducted for this magnetic recording medium in an environment of 70° C., where the flying height of the head from the medium surface was set to 2 nm, and the skew angle was 0° for the same track having a radius of 21 mm. As a result, a stable reproduction output by flying was obtained without crash after the passage of 4096 seconds, whereby there was no crash due to the continuous sliding.

The thermal energy assisted medium, according to any embodiment disclosed herein and possible given the descriptions above, may be used as the medium for realizing high density magnetic recording.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A thermal energy assisted medium, comprising:
    an artificial lattice film, the artificial lattice film having:
        a first layer comprising Co; and
        a second layer comprising Pt and Pd, the concentration of Pd in the second layer being from about 20 atomic% to about 40 atomic%,
        wherein the first layer and the second layer are laminated repeatedly to form a recording layer.

2. The thermal energy assisted medium according to claim 1, further comprising:
    a first soft magnetic layer formed via an adhesive layer on a substrate;
    a second soft magnetic layer formed via a non-magnetic intermediate layer on the first soft magnetic layer; and
    a crystal oriented control intermediate layer formed via an intermediate layer on the second soft magnetic layer,
    wherein the recording layer is formed on the crystal oriented control intermediate layer.

3. The thermal energy assisted medium according to claim 1, wherein at least five of the first layer and at least five of the second layer are present.

4. A system, comprising:
    a thermal energy assisted medium as recited in claim 1;
    at least one head for reading from and/or writing to the thermal energy assisted medium;
    a slider for supporting the head; and
    a control unit coupled to the head for controlling operation of the head.

5. A thermal energy assisted medium, comprising:
    an artificial lattice film, the artificial lattice film having:
        a first layer comprising Co; and
        a second layer comprising Pt and Pd,
        wherein the second layer comprises a lamination layer of a Pt-Pd alloy and a lamination layer of Pt,
        wherein the concentration of Pd in the second layer is between about 20 atomic% and about 40 atomic%, and
        wherein the first layer and the second layer are laminated repeatedly to form a recording layer.

6. The thermal energy assisted medium according to claim 5, further comprising:
    a first soft magnetic layer formed via an adhesive layer on a substrate;
    a second soft magnetic layer formed via a non-magnetic intermediate layer on the first soft magnetic layer; and
    a crystal oriented control intermediate layer formed via an intermediate layer on the second soft magnetic layer,
    wherein the recording layer is formed on the crystal oriented control intermediate layer.

7. The thermal energy assisted medium according to claim 5, wherein at least five of the first layer and at least five of the second layer are present.

8. The thermal energy assisted medium according to claim 5, wherein the Pt lamination layer is positioned between the first layer and the Pt-Pd alloy lamination layer in the recording layer.

9. A system, comprising:
    a thermal energy assisted medium as recited in claim 5;
    at least one head for reading from and/or writing to the thermal energy assisted medium;
    a slider for supporting the head; and
    a control unit coupled to the head for controlling operation of the head.

10. A thermal energy assisted medium, comprising:
    an artificial lattice film, the artificial lattice film having:
        a first layer comprising Co;
        a second layer comprising Pt; and
        a third layer comprising Pd,
        wherein the first, second and third layers are laminated repeatedly to form a recording layer.

11. The thermal energy assisted medium according to claim 10, further comprising:

a first soft magnetic layer formed via an adhesive layer on a substrate;

a second soft magnetic layer formed via a non-magnetic intermediate layer on the first soft magnetic layer; and a crystal oriented control intermediate layer formed via an intermediate layer on the second soft magnetic layer, wherein the recording layer is formed on the crystal oriented control intermediate layer.

12. The thermal energy assisted medium according to claim 10, wherein at least five of the first layer, at least five of the second layer, and at least 5 of the third layer are present.

13. The thermal energy assisted medium according to claim 10, wherein the second layers are positioned between the first and third layers in the recording layer.

14. A system, comprising:

a thermal energy assisted medium as recited in claim 10;

at least one head for reading from and/or writing to the thermal energy assisted medium;

a slider for supporting the head; and a control unit coupled to the head for controlling operation of the head.

15. The thermal energy assisted medium according to claim 1, further comprising:

a first soft magnetic layer formed above an adhesive layer on a substrate;

a second soft magnetic layer formed above a non-magnetic intermediate layer that is above the first soft magnetic layer; and a crystal oriented control intermediate layer formed above an intermediate layer that is above the second soft magnetic layer, wherein the recording layer is formed above the crystal oriented control intermediate layer.

16. The thermal energy assisted medium according to claim 5, further comprising:

a first soft magnetic layer formed above an adhesive layer on a substrate;

a second soft magnetic layer formed above a non-magnetic intermediate layer that is above the first soft magnetic layer; and a crystal oriented control intermediate layer formed above an intermediate layer that is above the second soft magnetic layer, wherein the recording layer is formed above the crystal oriented control intermediate layer.

17. The thermal energy assisted medium according to claim 10, further comprising:

a first soft magnetic layer formed above an adhesive layer on a substrate;

a second soft magnetic layer formed above a non-magnetic intermediate layer that is above the first soft magnetic layer; and a crystal oriented control intermediate layer formed above an intermediate layer that is above the second soft magnetic layer, wherein the recording layer is formed above the crystal oriented control intermediate layer.

* * * * *

UNITED STATES PATENT AND TRADEMARK OFFICE
CERTIFICATE OF CORRECTION

| | |
|---|---|
| PATENT NO. | : 9,099,140 B2 |
| APPLICATION NO. | : 12/630707 |
| DATED | : August 4, 2015 |
| INVENTOR(S) | : Hiroyuki Suzuki et al. |

It is certified that error appears in the above-identified patent and that said Letters Patent is hereby corrected as shown below:

In the specification:

col. 2, line 46 replace "current lw." with --current Iw.--;

col. 6, line 29 replace "(hut not so limited)" with --(but not so limited)--;

col. 6, line 42 replace "current lw" with --current Iw--;

col. 6, line 46 replace "current lw" with --current Iw--;

col. 6, line 49 replace "current lw," with --current Iw,--;

col. 6, line 51 replace "temperature Te." with --temperature Tc.--;

col. 6, line 54 replace "current lw," with --current Iw,--;

col. 6, line 66 replace "current lw" with --current Iw--;

col. 7, line 1 replace "current lw" with --current Iw--;

col. 7, line 14 replace "current lw" with --current Iw--;

col. 7, line 17 replace "current lw=40" with --current Iw=40--;

col. 7, line 21 replace "firmed in thickness" with --formed in thickness--;

col. 7, line 26 replace "at lw=40" with --at Iw=40--;

col. 8, line 61 replace "current lw=40" with --current Iw=40--;

col. 9, line 12 replace "lw was fixed" with --Iw was fixed--;

col. 9, line 56 replace "at lw=40" with --at Iw=40--.

Signed and Sealed this
Twenty-third Day of February, 2016

Michelle K. Lee
*Director of the United States Patent and Trademark Office*